Patented Dec. 28, 1937

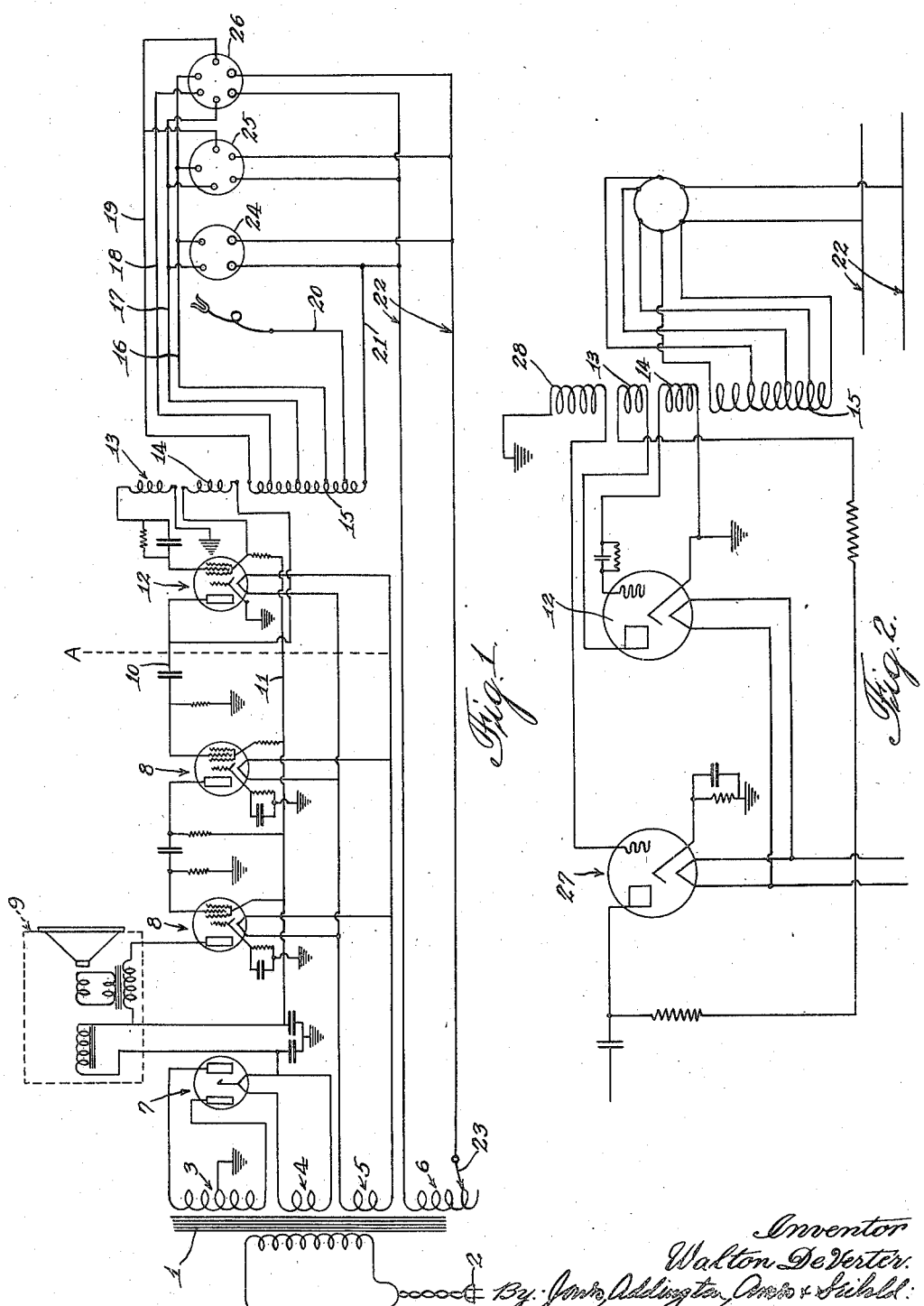

2,103,450

UNITED STATES PATENT OFFICE 2,103,450

TUBE TESTING DEVICE

Walton De Verter, Chicago, Ill., assignor of one-third to Samuel L. Brenner, Chicago, Ill.

Application October 5, 1936, Serial No. 103,974

12 Claims. (Cl. 250—27)

This invention relates to radio tube testers, and more particularly to a so-called noise detector for radio tubes whereby any defects which tend to make the tube noisy in use will cause an audible frequency in an audio-amplifier circuit and may be immediately detected through the noise produced in the loudspeaker or by the fluctuation of a suitable indicator.

It is an object of the present invention to provide a tube testing device in which no oscillation is produced in the tubes being tested, and the testing may be easily and quickly accomplished by merely inserting the tube to be tested and without adjustment of moving parts, such as switches or variable condensers or inductances. That is, any tube may be tested in its respective test socket without manually varying any of the electrical characteristics of associated testing circuits, except that the heater or filament voltages may be manually varied to conform with requirements of the various tubes.

A further object is the provision of a tube testing device of the character described which may be operated by any one, whether familiar with the tube testing art or not.

Further objects will be apparent from the specification and the appended claims.

In the drawing, Figure 1 is a diagrammatic illustration of a testing device illustrating one embodiment of the invention.

Fig. 2 is a slightly modified form illustrating the use of a detector in combination with the oscillator and audio-amplifier circuits.

Referring to the drawing in detail, the embodiment illustrated in Fig. 1 comprises the usual tapped transformer 1 such as commonly used in connection with a radio receiving set. The transformer is preferably adapted for use on the usual 110-volt circuit and the primary is provided with a connector 2 for connection to the usual power circuit. The transformer 1 is provided with secondary windings 3, 4, 5, and 6, the windings 3, 4, and 5 being arranged to provide suitable voltages to an audio-amplifier circuit and to an oscillator circuit associated therewith.

The audio-circuit includes a rectifier tube 7 and one or more amplifier tubes 8, which are connected in the usual manner with a loudspeaker 9. All of the circuits and associated elements illustrated at the left of the dotted line A—A in Fig. 1 comprise a rectifier and an ordinary audio-amplifier unit, one tube of which may function as an indicator, and it is believed need not be further described in detail.

An oscillator is connected to the input conductors 10 and 11 of the audio-circuit, and comprises an oscillator tube 12 and oscillator coils 13 and 14 and appropriate circuits therefor, the coil 14 and the plate of the oscillator tube being connected as illustrated to the input conductor 10 of the audio-amplifier, and the oscillator coil 13 being connected to the grid of the oscillator tube 12, whereby a continuous oscillation is provided.

The filament of the oscillator tube is energized from the transformer secondary coil 5 in the same manner as the audio-frequency tubes 8. It will therefore be apparent that that portion of the embodiment just described comprises an audio-frequency circuit having a high frequency oscillator connected therewith. In other words, the oscillator is so connected as to provide a source of constant high frequency oscillations, any modulation of which will be transmitted through the audio-frequency circuit to the loud-speaker.

The testing circuits, which are shown at the right of Fig. 1, are preferably entirely separate from the oscillator and amplifier circuits just described, except for an inductive or equivalent coupling relationship to the oscillator. This inductive relationship is preferably provided by means of a coil 15, which is positioned in inductive relation to the oscillator coils 13 and 14, and the coil 15 is suitably tapped by means of conductors 16, 17, 18, 19, and 20, the outer end of the coil being connected by means of a conductor 21, to a filament circuit 22, which latter is energized from the transformer by means of the secondary 6. The filament or heater circuit may be provided with a switch 23, whereby the circuit may be made to cover a comparatively wide range of voltage. It has been found in practice that if the coil 6 is tapped in such a manner that the voltage is provided in steps of 2, 5, and 25 volts, a sufficiently wide range may be covered for all ordinary purposes. It will be understood that this switch is not essential.

A plurality of testing sockets 24, 25, and 26 is connected to the filament circuit 22 in the usual manner, and any desired number of sockets may be provided in accordance with particular tubes to be tested. In the present instance only three testing sockets are illustrated. However, it will be understood that additional sockets may be provided to accommodate tubes having a greater number of elements therein than those illustrated, it being desirable to connect all of the tube elements in the circuit after the manner illustrated, whereby each element is connected to a corresponding tap on the coil 15 in a manner to provide a suitable voltage in accordance with the characteristics of the particular element. The tap 20 provides a connector for the usual top contact of such tubes as have an upper grid terminal.

The operation of the device is substantially as follows:

When a tube to be tested is inserted in one of the testing sockets, the filament is heated to, or near, the normal operating temperature, and it will be apparent that the circuit connections are such that the tube may then function as a high frequency rectifier when high frequency oscillations are impressed on the associated circuit, including its tapped portion of inductance 15. Each element of the tube except the cathode acts as an anode and provides, through the tapped circuit of the coil 15, a steady load on the oscillator circuit through the coils 13 and 14. The oscillator previously described provides a constant high frequency oscillation of a fixed amplitude, and this high frequency is impressed on the testing circuit by means of the oscillator coils 13 and 14 acting inductively through the tapped coil 15.

Any disturbance or variation in the load impressed on the oscillator circuit will, by fluctuating the impedance of the circuit, modulate the oscillator tube at an audio-frequency. The modulation is picked up by the audio-amplifier and made audible by means of the speaker 9. It will be apparent that the modulation may be made visible by means of a suitable indicating device such as a cathode ray tube.

The variation in the load impressed on the oscillator circuit may be caused by irregular electron emission, elements touching each other, faulty internal connections, leakage between the elements, or other defects which tend to make the tube noisy.

In order to provide a more thorough test for noise, the side of the tube is usually struck gently with the finger or a small rubber hammer, or a lead pencil having a rubber tip may be used. If the tubes under test are not defective, there will be no variation in the high frequency oscillation, and hence no noise other than the usual slight hum or hiss will be audible in the loud-speaker. If the tubes under test are gently tapped and any of the elements are loose or capable of being vibrated, this will produce a modulation of the oscillator tube, thus immediately producing an audible sound in the loud-speaker as a buzz or crackle.

The coupling of the oscillator circuit to the tube under test is illustrated as being accomplished by means of a coil inductively related to the oscillating circuit. However, it may be accomplished by connecting the elements of the tubes under test directly with the oscillating coil by suitable taps, or additional elements may be provided within the oscillating tube and suitably connected to the testing circuit. However, an inductive coupling is preferable.

It will be noted that in the embodiments illustrated and described herein, there is no possibility of oscillation in the tubes under test.

Fig. 2 illustrates a method of including a detector tube between the oscillator and the audio-frequency circuits previously described. In this embodiment, a detector tube 27 is connected in the usual manner between the audio-circuit and the oscillator tube 12, and the grid is inductively related to the oscillator coils 13 and 14 by means of a coil 28. The tapped coil 15 is inductively related to the oscillator circuit in the same manner as previously described.

Modifications may be made without departing from the spirit of the invention. For instance, wherever the word "filament" is used in the claims it is intended to cover any suitable type of heater, and it is desired therefore that the invention be limited only by the prior art and the scope of the appended claims.

Having thus described this invention, what is claimed and desired to be secured by Letters Patent is:

1. The method of testing a radio tube comprising using said tube as a rectifier to cause a normally constant load on an electrically associated high frequency oscillator whereby any fluctuations in the load caused by internal defects in the tube will modulate the oscillator current, and transmitting said modulated current to an indicator.

2. The method of testing a radio tube comprising using said tube as a rectifier to cause a normally constant load on an electrically associated high frequency oscillator whereby any fluctuations in the load caused by internal defects in the tube will modulate the oscillator current, amplifying said modulations, and transmitting said modulations to a loud-speaker.

3. The method of testing a radio tube comprising using said tube as a rectifier to cause a normally constant load on an inductively related high frequency oscillator whereby any fluctuation in the load caused by internal defects in the tube will modulate the oscillator current, and transmitting said modulations to an indicator.

4. The method of testing a radio tube in an inductive circuit comprising using the tube to rectify the current impressed on the circuit by an oscillator whereby the rectified current normally constantly maintains a load on the oscillator, which load fluctuates at audio-frequency in accordance with defects in the tube and thereby modulates the oscillator current at audio-frequency, and transmitting said audio-frequency to an indicator.

5. The method of testing a radio tube comprising heating the filament, connecting each element of the tube except the filament to a circuit corresponding to the characteristics of the element, impressing a current of predetermined high frequency on said circuits in a manner to maintain a constant load on the high frequency source, whereby defects in the tube will cause fluctuations in the load to modulate the oscillator current, and transmitting said modulations to an indicator.

6. A tube testing device comprising a high frequency oscillator, a testing circuit arranged for the electrical connection of the tube elements thereto, means for energizing a connected tube, said testing circuit being coupled to said oscillator in a manner to cause defects in said tube to modulate the high frequency current.

7. A tube testing device comprising a high frequency oscillator, a tube testing circuit to receive tubes for test and arranged to cause fluctuations in the current of the testing circuit in accordance with defects in the tube being tested, said circuit being inductively related to said oscillator to maintain a constant load thereon, means to modulate said high frequency current in accordance with said fluctuations, and means to sensibly indicate said modulation.

8. A tube testing device comprising an audio-amplifier, an oscillator connected to said amplifier for generating a high frequency current, an indicator coupled to said amplifier in a manner to indicate fluctuations in said high frequency current, a testing circuit arranged to be characteristically affected by said oscillator, means to enable the electrical connection to said circuit of tubes to be tested, means for energizing a connected tube whereby a constant load is applied to said oscillator and whereby defects in said tube will cause fluctuations in said high frequency current to sentiently effect said indicator.

9. A tube testing device comprising an audio-amplifier having an audible signaling device associated therewith, means for energizing the filament circuit of said amplifier, a high frequency oscillator for energizing the audio-circuit when the high frequency is modulated, a test socket to receive radio tubes, means to energize the filament of a tube in said socket, the remaining elements of the tube being each connected in a circuit having electrical characteristics corresponding to the particular element, said element circuits being electrically related to said oscillator whereby the high frequency current will be modulated at audio-frequency by defects in a tube under test.

10. A tube testing device comprising an audio-amplifier having an audible signaling device associated therewith, means for energizing the filament circuit of said amplifier, a high frequency oscillator for energizing the audio-circuit when the high frequency is modulated, a test socket to receive radio tubes, means to energize the filament of a tube in said socket, the remaining elements of the tube being each connected in a circuit having electrical characteristics corresponding to the particular element, said element circuits being inductively related to said oscillator to maintain a constant load thereon whereby the high frequency current will be modulated at audio-frequency by defects in a tube under test.

11. A tube testing device comprising a high frequency oscillator, a testing circuit arranged for electrical connection of tube elements thereto, said testing circuit being coupled to said oscillator to provide a load thereon, an inductance in said testing circuit and having individual tap connections to said tube elements, an indicator, and means whereby fluctuations of voltage across any part of said inductance caused by defects in said tube may be transmitted to said indicator.

12. A tube testing device comprising a high frequency oscillator, a testing circuit arranged for electrical connection of tube elements thereto, a coupling between said testing circuit and said oscillator to provide a load thereon, said testing circuit and coupling being arranged to provide different radio frequency potentials to corresponding tube elements, an indicator, and means whereby fluctuations of any potential caused by defects in said tube may be transmitted to said indicator.

WALTON DE VERTER.